(12) United States Patent
Lee

(10) Patent No.: US 6,473,667 B1
(45) Date of Patent: Oct. 29, 2002

(54) THREE DIMENSION COMPUTER MODEL FULL SIZE GRADING SYSTEM FOR PROCESSING A SHOE MODEL BY A TRIANGULAR GEOMETRY MODE

(76) Inventor: Joe Lee, 9-1F, No. 123, Sec. 3, Taichung Kang Rd, Taichung (TW)

( * ) Notice: Subject to any disclaimer, the term of this patent is extended or adjusted under 35 U.S.C. 154(b) by 0 days.

(21) Appl. No.: 09/550,251

(22) Filed: Apr. 14, 2000

(51) Int. Cl.[7] .............................................. G06F 19/00
(52) U.S. Cl. ...................................... 700/118; 700/182
(58) Field of Search ................................ 700/118, 131, 700/135, 183, 132, 182, 192; 318/568.1, 578; 73/172; 12/146 L

(56) References Cited

U.S. PATENT DOCUMENTS

| | | | | |
|---|---|---|---|---|
| 4,541,054 A | * | 9/1985 | Peck et al. ................ | 318/568.1 |
| 4,558,420 A | * | 12/1985 | Gerber ................... | 318/568.13 |
| 4,817,222 A | * | 4/1989 | Shafir ....................... | 12/146 L |
| 5,339,252 A | * | 8/1994 | White et al. .............. | 12/146 L |
| 6,042,759 A | * | 3/2000 | Marshall .................... | 12/146 L |

* cited by examiner

Primary Examiner—Leo Picard
Assistant Examiner—Kidest Bahta
(74) Attorney, Agent, or Firm—Rosenberg, Klein & Lee

(57) ABSTRACT

A three dimension computer model full size grading system is used for processing a shoe model by a triangular geometry mode and includes the following steps: (a) a leading processing work: receiving triangular data for performing division of a common member and selecting characteristic lines, filling a grading table and a geometric relation table by a user, and storing the grading table and the geometric relation table in a data base; (b) a main processing work: inputting gauges of each engineering diagram, selecting each grading item, reading numbers and dimensions of each size stored in the grading table, reading data of each file and data of stick points of the common member stored in the geometric relation table, serially performing a grading operation processing on each geometric file of each size, building constraints in the whole group of triangular geometry to satisfy each grading specification in a local variation manner, and storing results of operation in the data base to respectively mate with positions of respective sizes; (c) a trailing processing work: setting C.A.M. parameters of base sizes, storing the C.A.M. parameters of the base sizes, analyzing geometric members being used by an inner program, deriving geometric members of new sizes from the data base for updating the geometric members of the new sizes, and calculating data of dimensions of all sizes for manufacturing a shoe model.

6 Claims, 9 Drawing Sheets

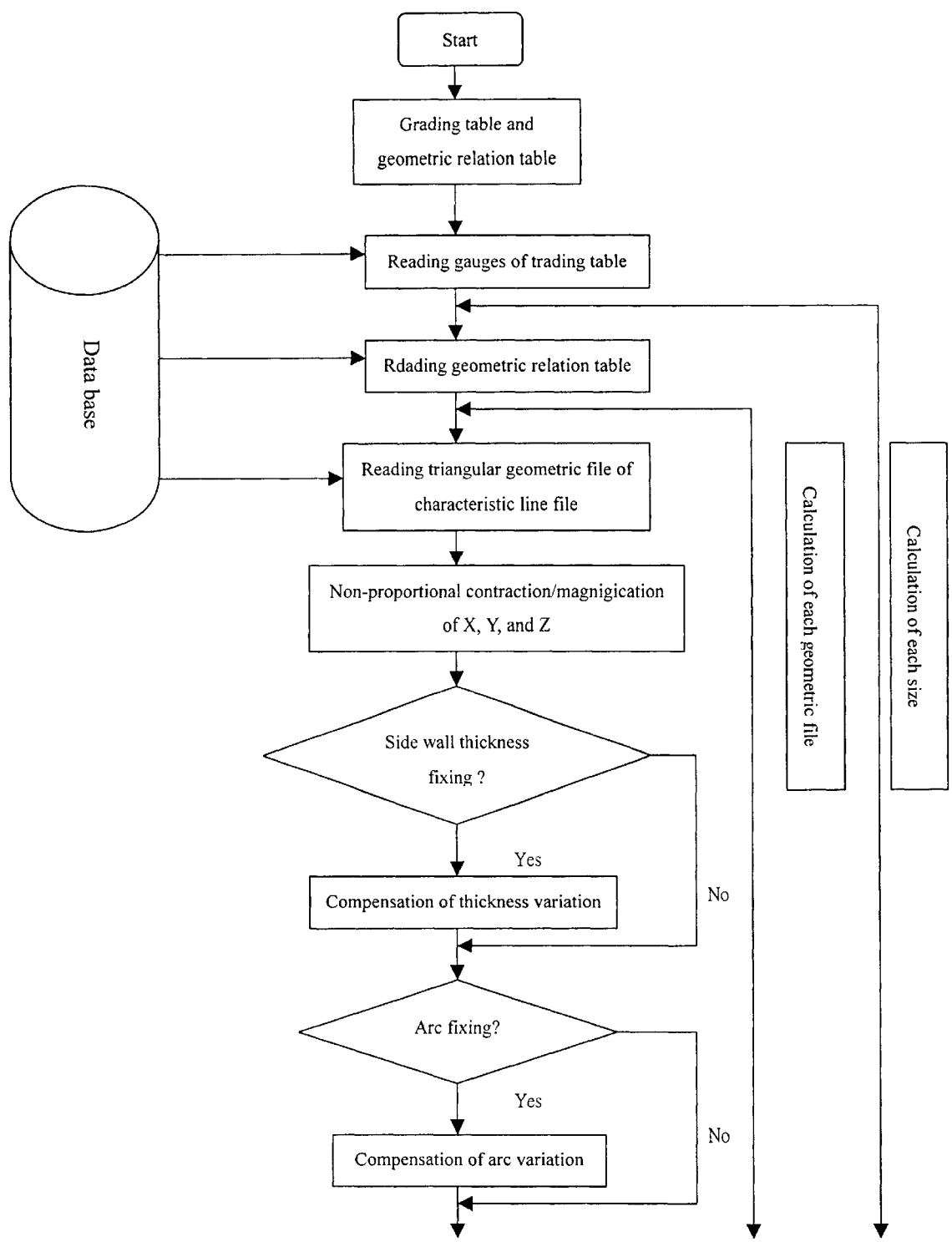
FIG 3-a

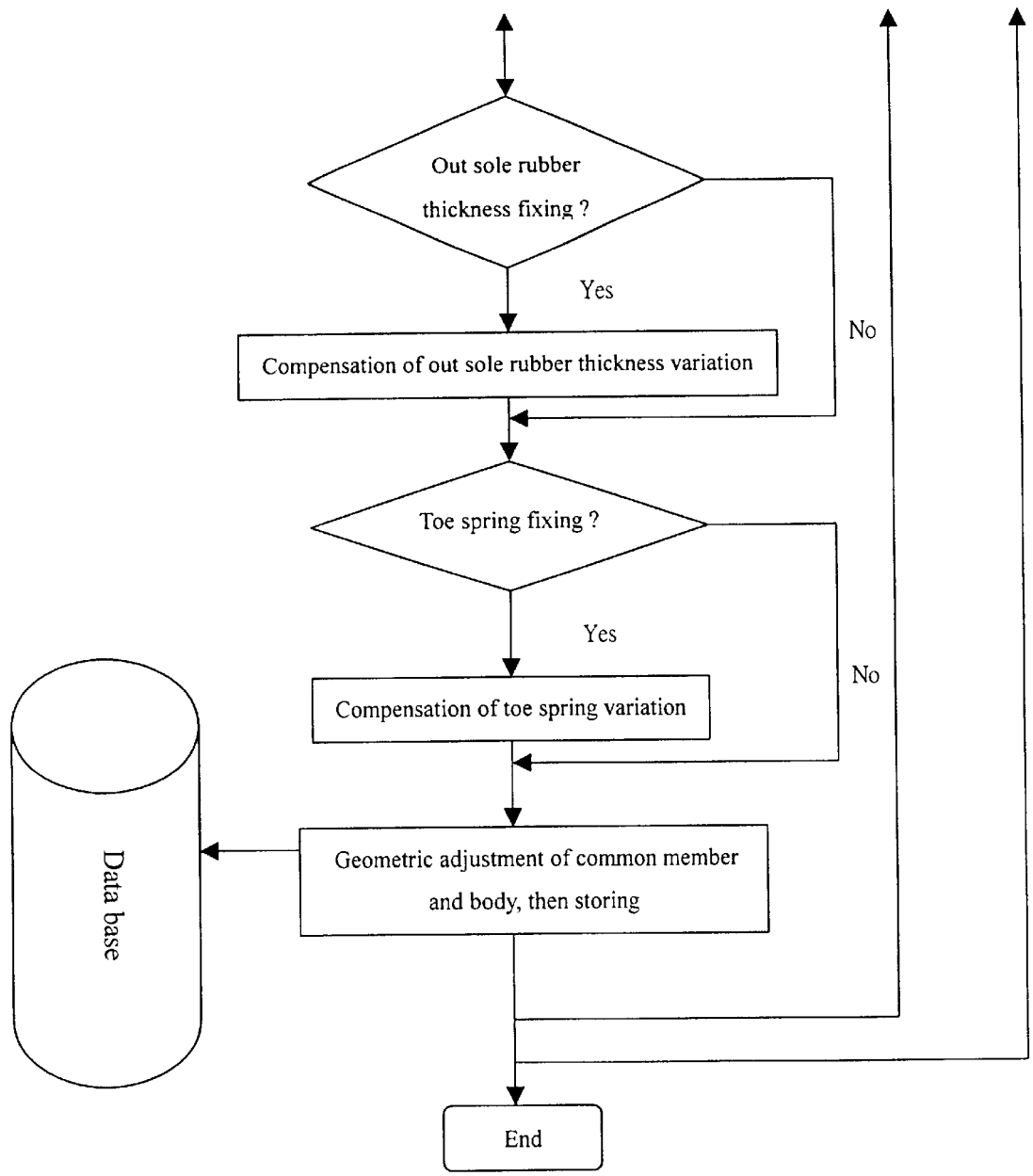
FIG 3-b

| | Number | Size | X | Y | Z | Toe Spring | Group1 | Group2 |
|---|---|---|---|---|---|---|---|---|
| #GRAD | 1 | 60 | -1.06 | -4.23 | 0. | 0 | 2 | 6 |
| #GRAD | 2 | 65 | -1.06 | -4.23 | 0. | 0 | 2 | 6 |
| #GRAD | 3 | 70 | -1.06 | -4.23 | 0. | 0 | 2 | 6 |
| #GRAD | 4 | 75 | -1.06 | -4.23 | -1.5 | 0 | 6 | 6 |
| #GRAD | 5 | 80 | -1.06 | -4.23 | 0. | 0 | 6 | 6 |
| #GRAD | 6 | 85 | 99 | 272 | 43. | 16. | 5 | 6 | 6 |
| #GRAD | 7 | 90 | 1.06 | 4.23 | 0. | 0 | 6 | 6 |
| #GRAD | 8 | 95 | 1.06 | 4.23 | 0. | 0 | 6 | 6 |
| #GRAD | 9 | 100 | 1.06 | 4.23 | 0 | 0 | 10 | 6 |
| #GRAD | 10 | 105 | 1.06 | 4.23 | 1.5 | 0 | 10 | 6 |
| #GRAD | 11 | 110 | 1.06 | 4.23 | 0. | 0 | 10 | 6 |
| #GRAD | 12 | 115 | 1.06 | 4.23 | 0. | 0 | 10 | 16 |
| #GRAD | 13 | 120 | 1.06 | 4.23 | 0. | 0 | 10 | 16 |
| #GRAD | 14 | 125 | 1.06 | 4.23 | 0 | 0 | 16 | 16 |
| #GRAD | 15 | 130 | 1.06 | 4.23 | 1.5 | 0 | 16 | 16 |
| #GRAD | 16 | 135 | 1.06 | 4.23 | 0. | 0 | 16 | 16 |
| #GRAD | 17 | 140 | 1.06 | 4.23 | 0. | 0 | 16 | 16 |
| #GRAD | 18 | 145 | 1.06 | 4.23 | 0. | 0 | 16 | 16 |

FIG 5

```
$CAM
==============================================================================
$INNER
==============================================================================
#INNER    TOP.JDF
$EVAIN
==============================================================================
#FOLD     EI_R1.STL      3.      71.     -7.5    4       3
#FOLD     EI_R2.STL      0.      53.6    -7.5    4       3
#FOLD     EI_R3.STL     -2.3     36.6    -8      4       3
#BODY     EI_BODY.STL
$EVAOUT
==============================================================================
#RIGID/1  SHANK.STL     -41.8   -34       0      4
#RIGID    EO_BAG.STL    -12    -100.8     0      4
#FOLD/1   EO_RIB.STL    -12.3  -135.4   -27.4    4       1
#BODY     BODY.STL
$INSERT   REF            FILE
==============================================================================
#RIGID    SHANK.STL      SHANK_OUT.STL
#RIGID    EO_RIB.STL     RIBON.STL
#RIGID    EO_BAG.STL     BAG_OUT.STL
$RBIN     REF            FILE
==============================================================================
$RBOUT
==============================================================================
#RIGID/2  RO_LOGO.STL   -14.    -85.     3.25    3
#BODY     RO_BODY.STL
```

FIG 6

THREE DIMENSION COMPUTER MODEL FULL SIZE GRADING SYSTEM FOR PROCESSING A SHOE MODEL BY A TRIANGULAR GEOMETRY MODE

BACKGROUND OF THE INVENTION

1. Field of the Invention

The present invention relates to a three dimension computer model full size grading system for processing a shoe model by a triangular geometry mode.

2. Description of the Related Art

A conventional shoe model system in accordance with the prior art uses a C.A.D./C.A.M. (Computer Aid Design/Computer Aid Manufacturing) system which are operated manually by engineers for designing the three dimension (3D) computer model. However, in the conventional curve model structure, it is difficult to achieve a three dimension (3D) full size grading or local zone size grading of the shoe model.

As shown in FIG. 12, a manufacturing flow chart of a conventional shoe model system in accordance with the prior art is shown, wherein the engineer uses a base size of three dimension (3D) computer model by a C.A.D./C.A.M. system for performing a grading operation according to a two dimension (2D) full size engineering diagram.

The conventional shoe model making system includes the following operations:

1. non-proportional contraction/magnification of X, Y, and Z;
2. multiple size stepwise share of air bags, oil bags, shoe shanks, ornaments, logo, etc.;
3. side wall thickness fixing;
4. out sole rubber thickness fixing;
5. toe spring setting;
6. arc fixing;
7. out sole thickness fixing; and
8. width fixing between destined characteristic lines.

The engineer has to set C.A.M. parameters for the 3D computer model of each size, and has to calculate and write the N.C. programs to operate a C.N.C. working machine for making the shoe model.

However, the conventional shoe model system has to install four to six sets of equipment used by four to six users, thereby greatly increasing the cost of the equipment and software. In addition, the conventional shoe model system has to spend one week to two weeks of working days for making the product, thereby increasing time of making and decreasing the efficiency of production and fabrication. Further, the software of the conventional shoe model system cannot execute an automatic calculation so that it is not easy to assure the quality and stability of the product. Moreover, the conventional shoe model system has to spend six months of training time, thereby greatly increasing the time for training a user.

SUMMARY OF THE INVENTION

The primary objective of the present invention is to provide a three dimension computer model full size grading system for processing a shoe model by a triangular geometry mode, wherein, the system only needs one user and one set of equipment without having to install four to six sets of equipment used by four to six users as disclosed in the conventional shoe model system, thereby greatly decreasing the cost of the equipment and software.

Another objective of the present invention is to provide a three dimension computer model full size grading system for processing a shoe model by a triangular geometry mode, wherein, the system only needs one working day without having to spend one week to two weeks of working days as disclosed in the conventional shoe model system, thereby shortening the time for manufacturing, and thereby enhancing the efficiency of production and fabrication.

A further objective of the present invention is to provide a three dimension computer model full size grading system for processing a shoe model by a triangular geometry mode, wherein, the software of the system can execute an automatic calculation, thereby obtaining a product with a high quality and stability.

A further objective of the present invention is to provide a three dimension computer model full size grading system for processing a shoe model by a triangular geometry mode, wherein, the system only needs one week for training a user without having to spend six months of training time as disclosed in the conventional shoe model system, thereby shortening the time for training a user.

In accordance with one aspect of the present invention, there is provided a three dimension computer model full size grading system for processing a shoe model by a triangular geometry mode. The three dimension computer model full size grading system comprises the following steps: (a) a leading processing work: receiving triangular data, performing division of a common member, selecting characteristic lines, filling a grading table and a geometric relation table by a user, and inputting and storing the grading table and the geometric relation table in a data base; (b) a main processing work: inputting gauges of each engineering diagram, selecting each grading item, inputting parameters, automatically reading numbers and dimensions of each size stored in the grading table, reading data of each file and data of stick points of the common member stored in the geometric relation table, serially performing a grading operation processing on each geometric file of each size, building constraints in the whole group of triangular geometry to satisfy each grading specification in a local variation manner, then finding geometric discontinuous positions which are caused by the common member for performing a repair work, and storing results of operation in the data base to respectively mate with positions of respective sizes; (c) a trailing processing work: setting C.A.M. parameters of base sizes, storing the C.A.M. parameters of the base sizes, analyzing geometric members being used by an inner program, deriving geometric members of new sizes from the data base for updating the geometric members of the new sizes, automatically calculating data of dimensions of all sizes for manufacturing a shoe model.

The grading operation processing of the main processing work includes non-proportional contraction/magnification of X, Y, and Z; multiple size stepwise share of air bags, oil bags, shoe shanks, ornaments, and logo; side wall thickness fixing; out sole rubber thickness fixing; toe spring setting; arc fixing; out sole thickness fixing; and width fixing between destined characteristic lines.

The data of dimensions calculated in the trailing processing work are used in a N.C. program so that a C.N.C. working machine can employ the N.C. program to work a model.

In addition, the trailing processing work can also supply data after grading so that a rapid prototype machine can use the data after grading to work a model.

Further benefits and advantages of the present invention will become apparent after a careful reading of the detailed description with appropriate reference to the accompanying drawings.

BRIEF DESCRIPTION OF THE DRAWINGS

FIG. 3 is a flow chart of a main processing work of the three dimension computer model full size grading system in accordance with the present invention;

FIG. 5 is a grading table of the three dimension computer model full size grading system in accordance with the present invention;

FIG. 6 is a geometric relation table of the three dimension computer model full size grading system in accordance with the present invention;

DETAILED DESCRIPTION OF THE INVENTION

Figure 1:
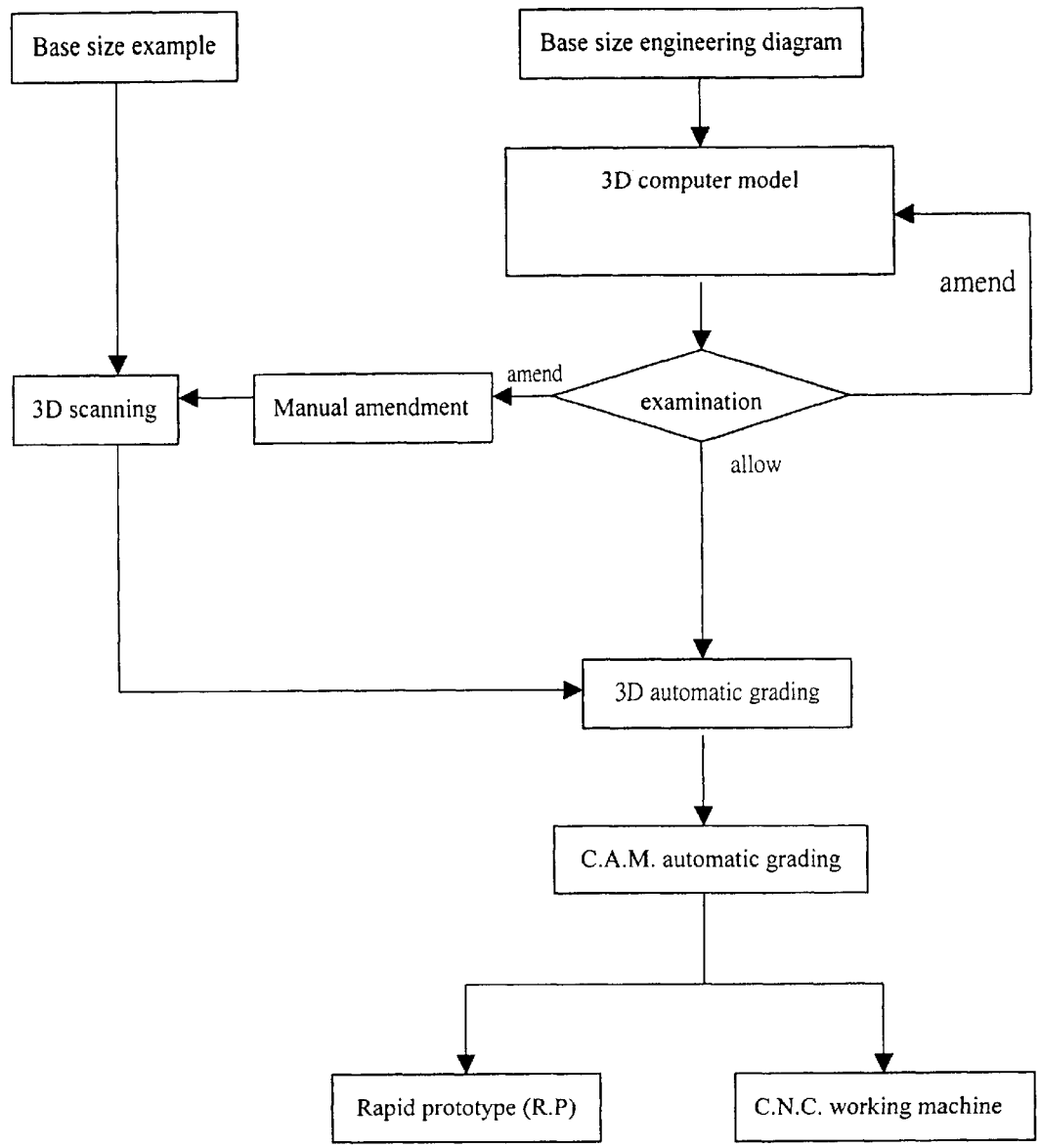
FIG. 1 is a manufacturing flow chart of a three dimension computer model full size grading system for processing a shoe model by a triangular geometry mode in accordance with the present invention.

Referring to the drawings and initially to FIG. 1, a manufacturing flow chart of the present invention is shown, wherein a three dimension computer model full size grading system for processing a shoe model by a triangular geometry mode in accordance with the present invention can be used to efficiently replace current complicated working processes and designs of the programs of the C.A.D./C.A.M. (Computer Aid Design/Computer Aid Manufacturing) which are operated manually by engineers. In addition, the three dimension computer model full size grading system for processing a shoe model by a triangular geometry mode in accordance with the present invention can be easily combined with the 3D (three dimension) scanning and the automatic grading of C.A.M. so that a rapid prototype machine or a C.N.C. working machine can use the system to mass produce shoe models, thereby increasing the production.

The three dimension computer model full size grading system for processing a shoe model by a triangular geometry mode according to the present invention comprises the following steps: (a) a leading processing work, (b) a main processing work; and (c) a trailing processing work.

Figure 2:
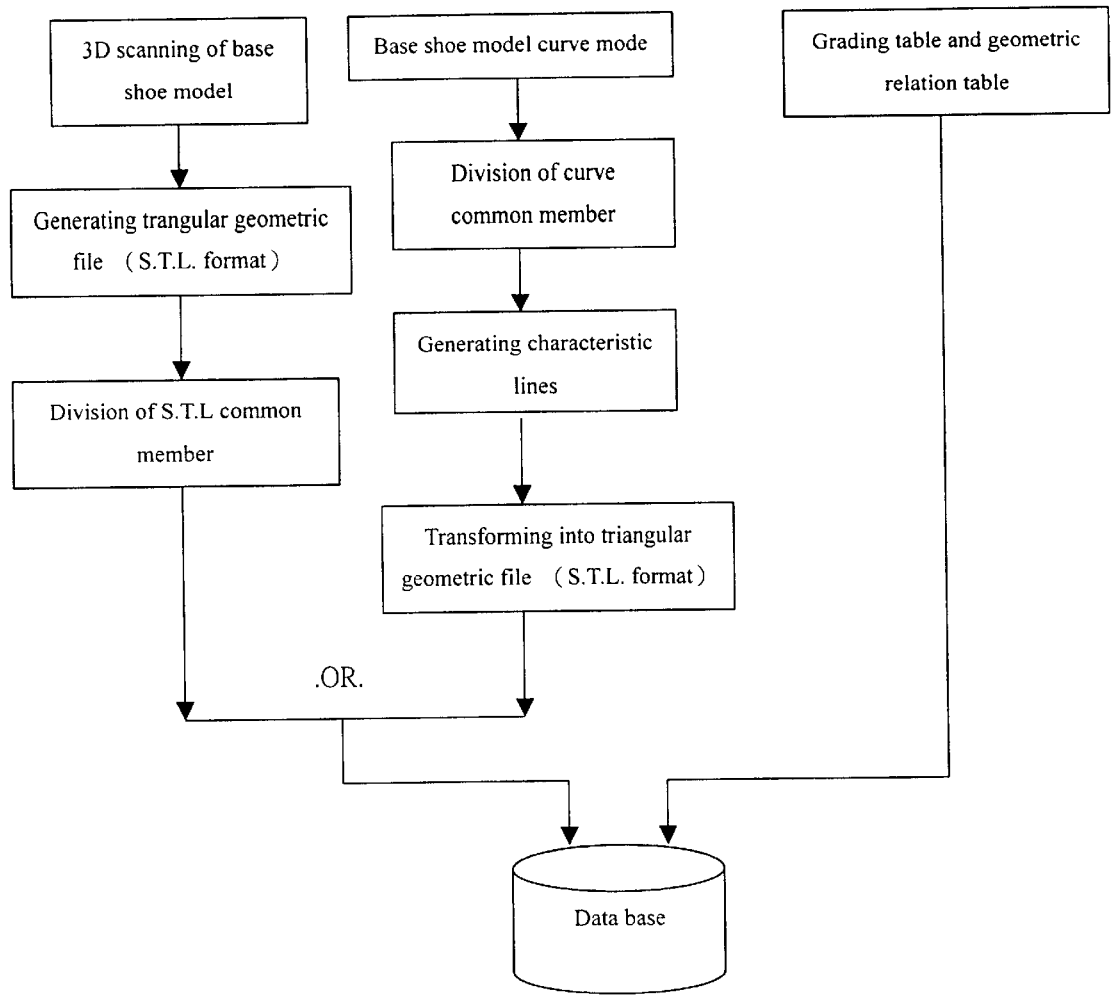
FIG. 2 is a flow chart of a leading processing work of the three dimension computer model full size grading system in accordance with the present invention.

Referring to FIG. 2, the leading processing work includes: receiving triangular data which are generated by three dimensional (3D) scanning (S.T.L. formats) or by a C.A.D. curve transformation, performing division of a common member, selecting characteristic lines, filling a grading table as shown in FIG. 5 and a geometric relation table as shown in FIG. 6 by a user, and inputting and storing the grading table and the geometric relation table in a data base.

Figure 7:
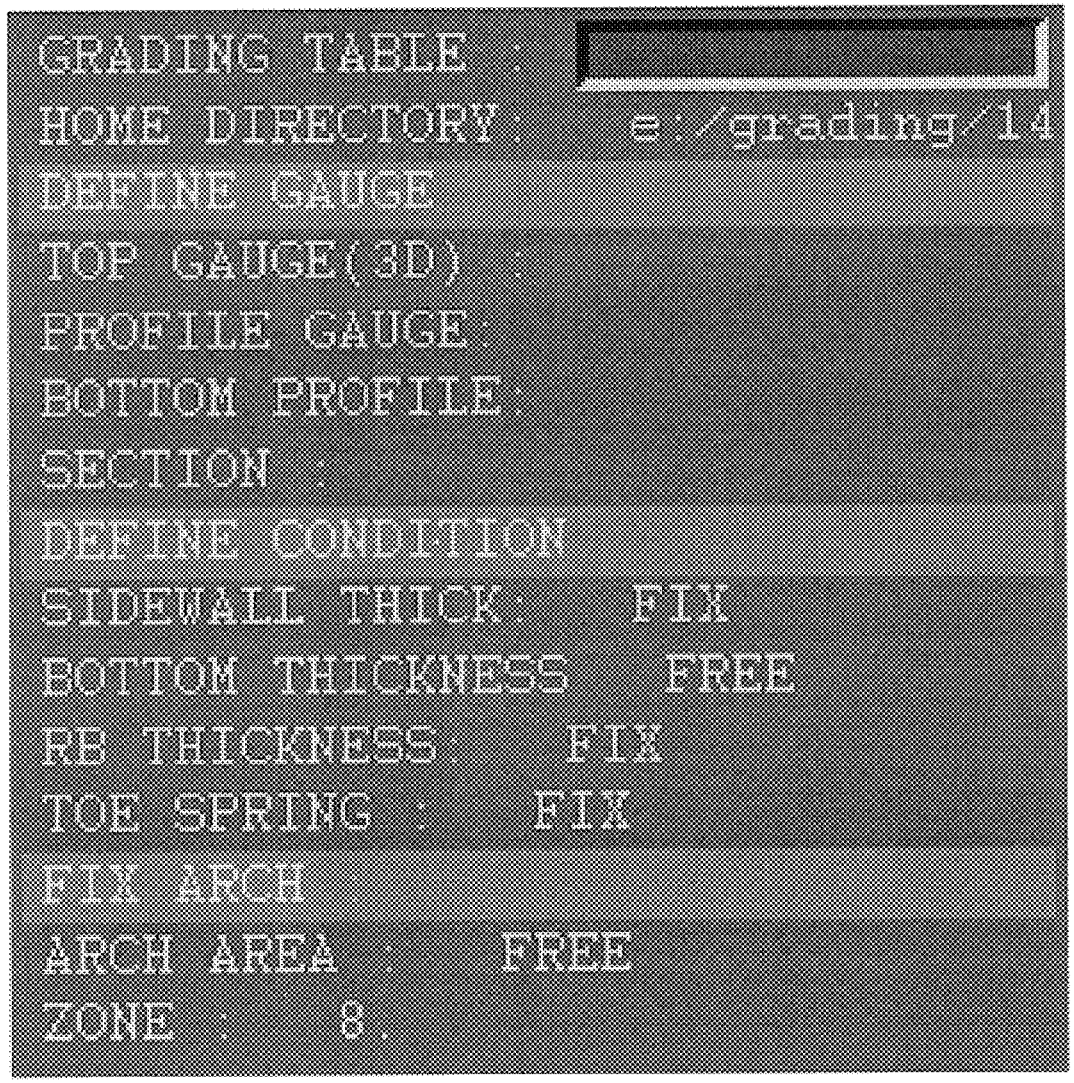
FIG. 7 is a parameter diagram of the three dimension computer model full size grading system in accordance with the present invention.

Referring to FIG. 3, the main processing work includes: inputting gauges of each engineering diagram by the user, selecting each grading item, and inputting parameters as shown in FIG. 7.

The system according to the present invention then automatically reads numbers and dimensions of each size stored in the grading table, then reads data of each file and data of stick points of the common member stored in the geometric relation table, and then serially performs a grading operation processing on each geometric file of each size.

The grading operation processing of the main processing work includes the following operations:

1. non-proportional contraction/magnification of X, Y, and Z;
2. multiple size stepwise share of air bags, oil bags, shoe shanks (for NIKE) or shoe torsion bar (for ADIDAS), ornaments, logo, etc.;
3. side wall thickness fixing;
4. out sole rubber thickness fixing;
5. toe spring setting;
6. arc fixing;
7. out sole thickness fixing; and
8. width fixing between destined characteristic lines.

The orders of the above-mentioned operations can be changed arbitrarily.

Then, the system according to the present invention will build constraints in the whole group of triangular geometry to satisfy each grading specification in a local variation manner, then finds geometric discontinuous positions which are caused by the common member for performing a repair work, and finally stores results of operation in the data base to respectively mate with positions of respective sizes.

Figure 8:
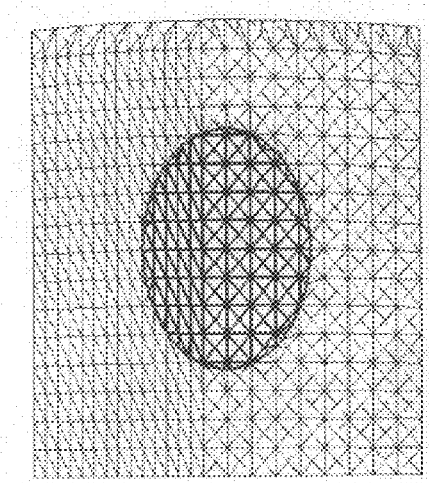
FIG. 8 is a schematic grading status diagram of the three dimension computer model full size grading system in accordance with the present invention.

FIG. 8 shows a status before grading, wherein the ellipse represents a common member, and the peripheral triangles represents the body of the shoe model.

Figure 9:
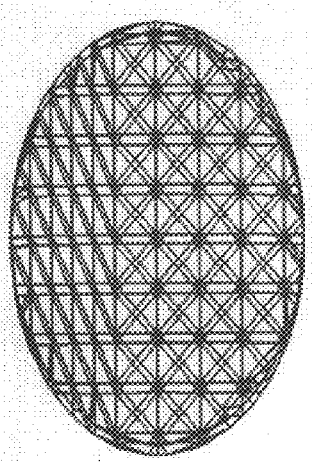
FIG. 9 is a schematic grading status diagram of the three dimension computer model full size grading system in accordance with the present invention.
Figure 10:
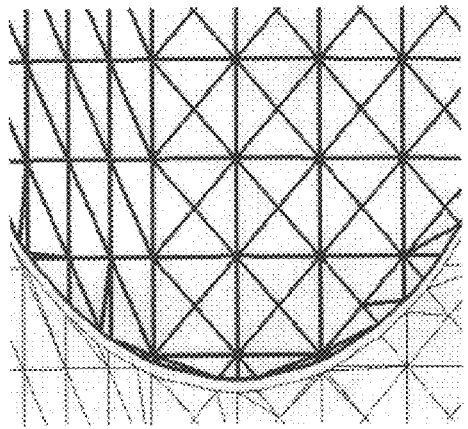
FIG. 10 is a schematic grading status diagram of the three dimension computer model full size grading system in accordance with the present invention.

FIG. 9 shows a status after grading, wherein the size of the common member is not changed, but will create a displacement, and the size of the body is changed according to the value of contraction/magnification of X, Y, and Z, and will form clearance as shown in FIG. 10. The system according to the present invention will record the relative positions of adjoining triangles before grading so as to derive values of compensation after grading according to the clearance of adjoining triangles.

Figure 11:
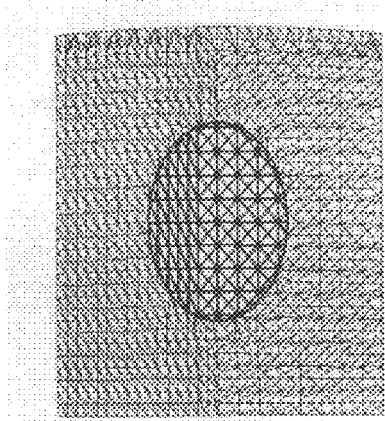
FIG. 11 is a schematic grading status diagram of the three dimension computer model full size grading system in accordance with the present invention.
Figure 12:
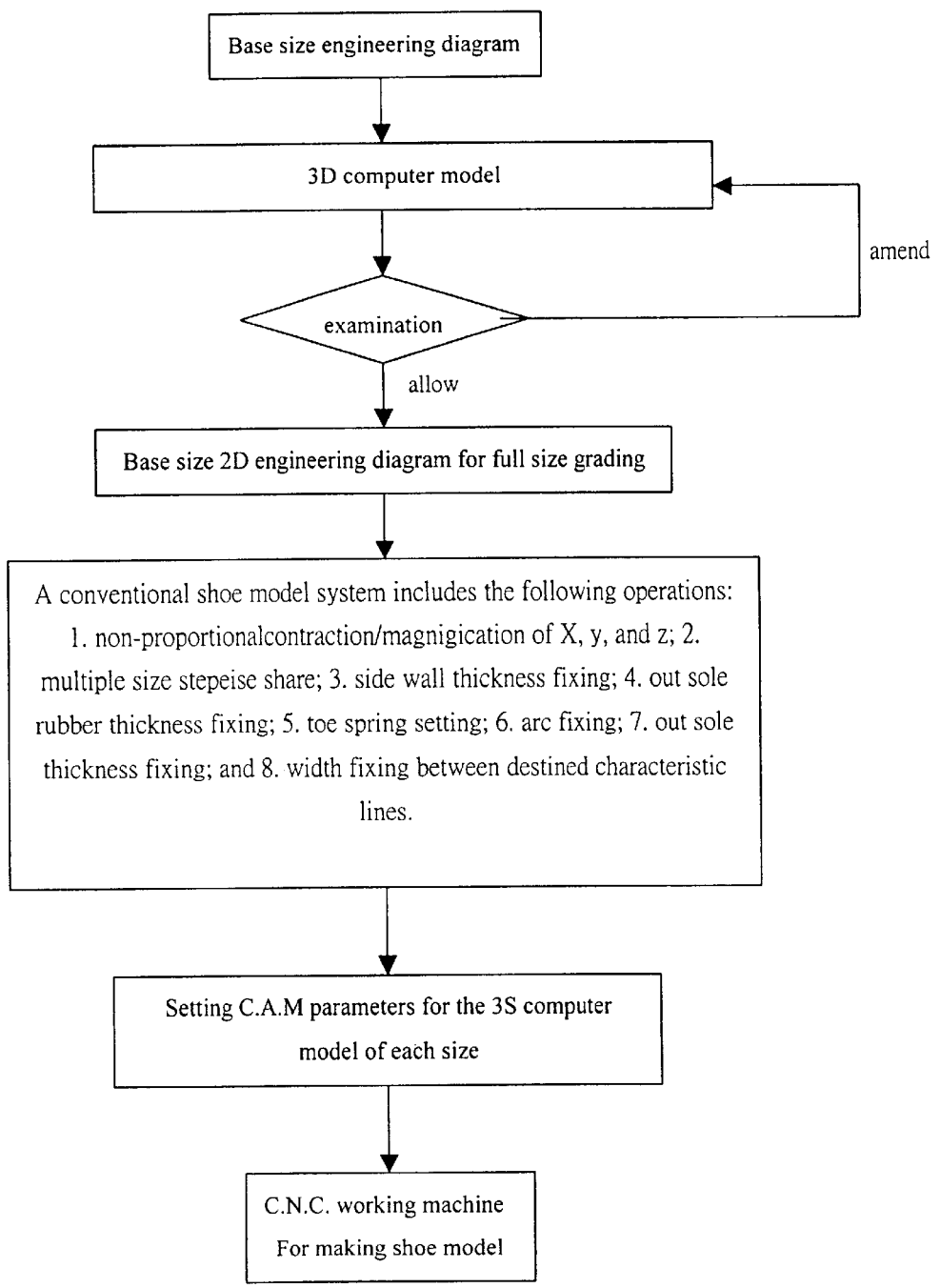
FIG. 12 is a manufacturing flow chart of a conventional shoe model system in accordance with the prior art.

FIG. 11 shows a result of compensation of displacement for the triangles with clearance.

Figure 4:
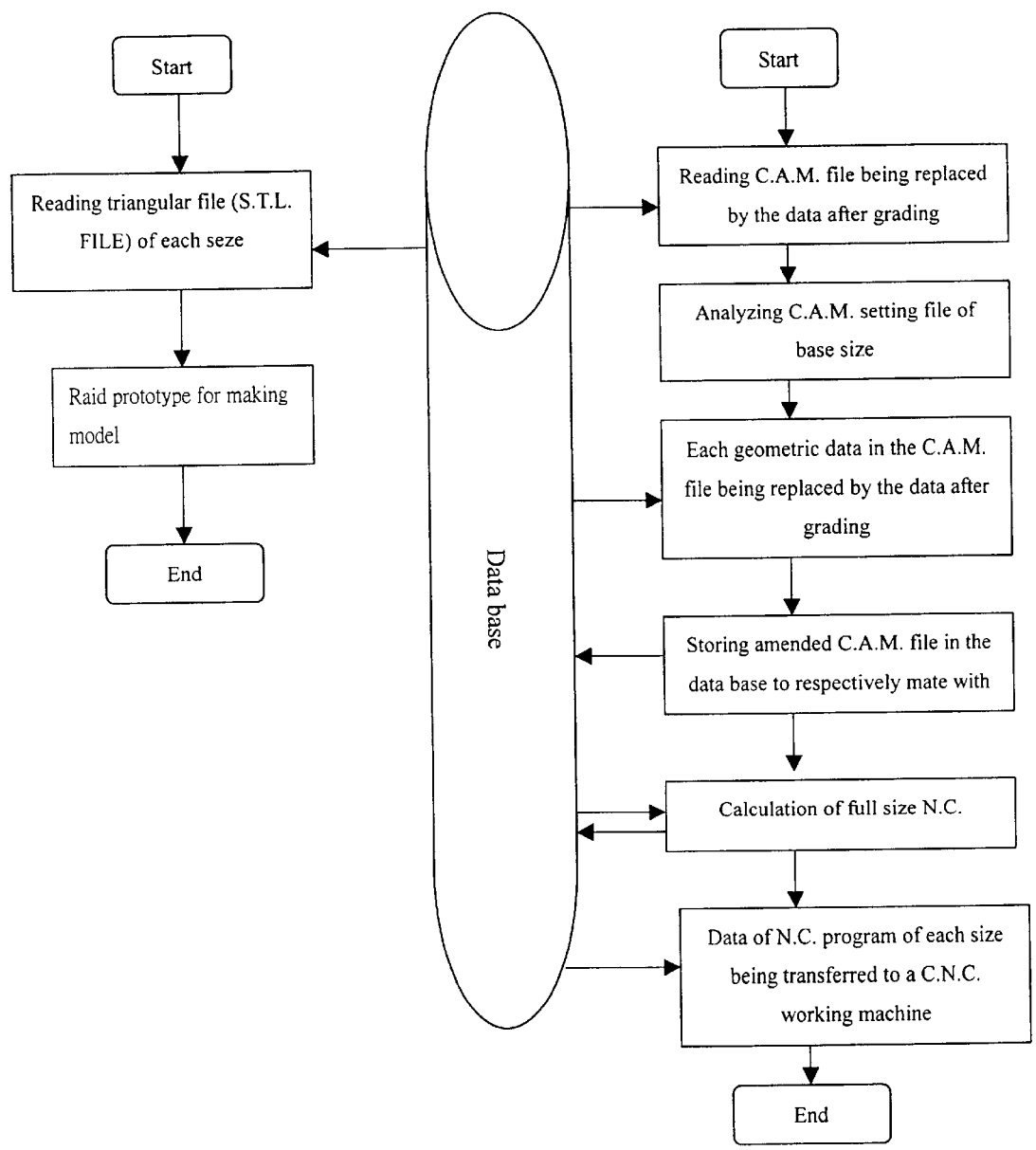
FIG. 4 is a flow chart of a trailing processing work of the three dimension computer model full size grading system in accordance with the present invention.

Referring to FIG. 4, the system according to the present invention can provide an efficient automatic grading function. The trailing processing work includes the following steps: setting C.A.M. parameters of base sizes, and storing the C.A.M. parameters of the base sizes. The inner program can then analyze geometric members being used, and derive geometric members of new sizes from the data base for updating the geometric members of the new sizes. The system according to the present invention can then automatically calculate data of dimensions of all sizes for manufacturing a shoe model.

The data of dimensions calculated in the trailing processing work can be used in a N.C. program so that a C.N.C.

working machine can employ the N.C. program to work a model. In addition, the trailing processing work supplies data after grading to a rapid prototype (R.P.) machine so that the rapid prototype machine can use the data after grading to work a model.

In such a manner, the system of a triangular geometry mode type according to the present invention has a good ability of local zone variation so as to perform a local zone grading of the shoe model. Therefore, the present invention uses a triangular geometry mode to develop a three dimension (3D) computer model full size grading system which can be used for performing a local zone grading of the shoe model.

Accordingly, the system according to the present invention only needs one user and one set of equipment without having to install four to six sets of equipment used by four to six users as disclosed in the conventional shoe model system, thereby greatly decreasing the cost of the equipment and software.

In addition, the system according to the present invention only needs one working day without having to spend one week to two weeks of working days as disclosed in the conventional shoe model system, thereby greatly shortening the time for manufacturing, and thereby enhancing the efficiency of production and fabrication.

Further, the software of the present system can execute an automatic calculation, thereby obtaining a product with a high quality and stability.

Moreover, the system according to the present invention only needs one week for training a user without having to spend six months of training time as disclosed in the conventional shoe model system, thereby shortening the time for training a user.

It should be clear to those skilled in the art that further embodiments may be made without departing from the scope of the present invention.

What is claimed is:

1. A three dimension computer model full size grading system for processing a shoe model by a triangular geometry mode, said three dimension computer model full size grading system comprising the following steps:

(a) a leading processing work:
  receiving triangular data,
  performing division of a common member,
  selecting characteristic lines,
  filling a grading table and a geometric relation table by a user, and
  inputting and storing said grading table and said geometric relation table in a data base;

(b) a main processing work:
  inputting gauges of each engineering diagram,
  selecting each grading item,
  inputting parameters,
  automatically reading numbers and dimensions of each size stored in said grading table,
  reading data of each file and data of stick points of said common member stored in said geometric relation table,
  serially performing a grading operation processing on each geometric file of each size,
  building constraints in the whole group of triangular geometry to satisfy each grading specification in a local variation manner,
  finding geometric discontinuous positions which are caused by said common member for performing a repair work, and
  storing results of operation in said data base to respectively mate with positions of respective sizes;

(c) a trailing processing work:
  setting C.A.M. parameters of base sizes,
  storing said C.A.M. parameters of said base sizes,
  analyzing geometric members being used by an inner program,
  deriving geometric members of new sizes from said data base for updating said geometric members of said new sizes,
  automatically calculating data of dimensions of all sizes for manufacturing a shoe model.

2. The three dimension computer model fill size grading system in accordance with claim 1, wherein said triangular data are generated by three dimensional scanning.

3. The three dimension computer model full size grading system in accordance with claim 1, wherein said triangular data are generated by a C.A.D. curve transformation.

4. The three dimension computer model full size grading system in accordance with claim 1, wherein said grading operation processing of said main processing work includes:
  non-proportional contraction/magnification of X, Y, and Z;
  multiple size stepwise share of air bags, oil bags, shoe shanks, ornaments, and logo;
  side wall thickness fixing;
  out sole rubber thickness fixing;
  toe spring setting;
  arc fixing;
  out sole thickness fixing; and
  width fixing between destined characteristic lines.

5. The three dimension computer model full size grading system in accordance with claim 1, wherein said data of dimensions calculated in said trailing processing work are used in a N.C. program so that a C.N.C. working machine can employ said N.C. program to work a model.

6. The three dimension computer model full size grading system in accordance with claim 1, wherein said trailing processing work supplies data after grading so that a rapid prototype machine can use said data after grading to work a model.

* * * * *